3,503,186
LIQUID MEMBRANE FOR SULPHUR DIOXIDE EXTRACTION

William J. Ward III, Schenectady, N.Y., assignor to General Electric Company, a corporation of New York
No Drawing. Filed Aug. 15, 1968, Ser. No. 752,803
Int. Cl. B01d 59/10
U.S. Cl. 55—16          4 Claims

ABSTRACT OF THE DISCLOSURE

A porous cellulose film about 1–3 mils thick impregnated with polyethylene glycol liquid is employed for the separation of sulphur dioxide from gas mixtures. A method for the preparation of such liquid films using tetraethylene glycol dimethyl ether (TEG-DME), is described.

BACKGROUND OF THE INVENTION

Ever-increasing attention is being focussed on the problem of air pollution and one of the pollutants about which the most concern has been expressed is sulphur dioxide. Sulphur dioxide pollution results in most part from the burning of coal and heavy fuel oil. In many urban areas the extent of sulphur dioxide pollution poses a serious health hazard and the Department of Health, Education and Welfare has predicted that the total sulphur dioxide discharge into the atmosphere will double by the year 1980 unless some improvement is made in the control practices presently employed with respect to stack gases. The search for an economically attractive process for the elimination of $SO_2$ has been extensive, however, to date research on this subject has been largely unsuccessful.

The use of liquid membranes for gas separation has been disclosed in U.S. Patent No. 3,335,545, Robb et al. incorporated herein by reference. It was disclosed in this patent that the conventionally recognized solid polymer barrier well-known in the art for the separation of gases through the phenomenon of selective permeation can be replaced by a liquid film resulting in a considerable increase in degree of separation of certain gases.

Immobilization or support of such a liquid film can be effected a number of ways. Thus, the thin liquid membrane can be supported on a porous, unwet backing having such fine holes that the liquid cannot run through the porous material; the liquid film can be supported on a non-interacting polymer film selected so that the ratio of permeation rate to thickness will be appreciably higher for the polymer than for the liquid film thereby insuring that the liquid film is the controlling permeation factor, or various polymer films can be made to take up large quantities of liquid as described in the Robb et al. patent.

Subsequently an improvement over the immobilized liquid membrane of Robb et al. embodying a phenomenon known as "facilitated transport" was made the subject of U.S. Patent No. 3,396,510, Ward et al., filed Aug. 15, 1966, and assigned to the assignee of this application. The aforementioned application is incorporated herein by reference. The application of facilitated transport to the transfer of carbon dioxide, sulphur dioxide, or oxygen across liquid membranes is disclosed therein employing in the case of $SO_2$, a large concentration difference of $HSO_3^-$ ions and $SO_3^=$ ions in the immobilized liquid film. These ions are termed "carrier species" and must be non-volatile and reversibly chemically reactive with the gaseous component the transport of which is being facilitated across the liquid membrane. In addition to the criteria recited for the carrier specie, it is also necessary that the material resulting from the chemical combination of the gaseous component and the carrier specie be non-volatile.

In a study of intermolecular forces exerted between solute and solvent molecules (L. F. Albright et al., Chem. Eng. Progress Sym. Ser. 44, vol. 59, 66 [1963]), it is reported that the solubility of $SO_2$ in tetraethylene glycol dimethyl ether (TEG-DME) and a number of other polar organic solvents is remarkably high. This high solubility was explained as being due to the formation of complexes between the sulphur atoms of the $SO_2$ and negative polar groups of the TEG-DME.

SUMMARY OF THE INVENTION

The extraction of $SO_2$ from a gas mixture is accomplished using a film of liquid polyethylene glycol. A suitable film construction employs a thin porous cellulose layer impregnated with a liquid polyethylene glycol, such as TEG-DME. First, a porous membrane of modified cellulose derivation is prepared, next, the cellulose derivative is hydrolyzed to cellulose, the hydrolyzing agent is leached out and the newly formed cellulose film is impregnated with the liquid polyethylene glycol.

DESCRIPTION OF THE PREFERRED EMBODIMENT

The porous membrane of cellulosic derivation initially prepared may be made by any of the methods disclosed in the following U.S. patents: U.S. 3,133,132, Loeb et al.; U.S. 3,133,137, Loeb et al.; U.S. 3,283,042, Loeb et al., and U.S. 3,310,488, Loeb et al. However, the preferred method of preparation thereof is described in U.S. patent application S.N. 672,025, Ward et al., filed Oct. 2, 1967, and assigned to the assignee of the instant application. The disclosure in each of the above-identified patents and patent application is incorporated herein by reference.

A matrix-forming material and a pore-producing agent are dissolved in an organic solvent to form a casting solution, the solution is cast to form a very thin membrane from which a portion of the organic solvent is evaporated for a predetermined period of time in an ambient having a partial pressure of the organic solvent approaching, but less than, the partial pressure of the organic solvent in the film as cast, the membrane so developed is immersed in a liquid in which the matrix-forming material is insoluble and which contains a hydrolyzing agent, the excess hydrolyzing agent is leached from the hydrolyzed film and the film is then immersed in a polyethylene glycol, as for example tetraethylene glycol dimethyl ether, and removed therefrom after impregnation with the polyethylene glycol.

The matrix-forming material is a cellulosic ether or ester derivative having the formula

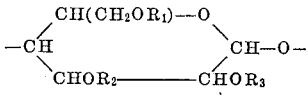

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms.

The pore-producing salt is one having an anion selected from the class consisting of iodide, bromide, tetraphenyl boron, salicylate, chlorate, tetraiodomercurate and fluosilicate.

Specific examples of the aforementioned cellulosic derivatives are cellulose acetate, cellulose acetatebutyrate, cellulose propionate and ethyl cellulose. Although an aqueous solution of the pore-producing salt is generally preferred, the pore-producing salt may be utilized as a solid without the addition of water. An example of such a salt is a salt having a thiocyanate anion, such as potassium thiocyanate.

By way of example, a casting solution containing a mixture of cellulose acetate (39.8 percent acetyl), acetone, water and magnesium perchlorate (22.2, 66.7, 10.81, and 1.1 weight percent, respectively) was prepared and a covered container thereof was placed in the casting compartment. All the equipment (casting plate, doctor blade, immersion bath tray, weights, etc.) for conducting the casting and immersion steps were cleaned and placed within the casting compartment. A sealed container of 3% acetone solution (1450 ml. of distilled water and 50 ml. of acetone) was prepared and placed within the casting compartment for use as an immersion bath.

The compartment was then closed and air previously passed through a column containing an acetone-distilled water solution (12.5 mole percent acetone) was circulated through the interior of the compartment until the air within the compartment was in equilibrium with the 12.5 mole percent acetone solution. The compartment was then sealed and subsequent operations were conducted from outside the compartment so as not to change the conditions deliberately imposed within the compartment.

The film is then cast by passing the doctor blade, or knife, across the glass casting plate in an inclined position with the ends of the knife resting upon side runners to control the thickness (about 1 to about 3 microns) of the as-cast film. Shortly before the immersion step the container of immersion fluid is emptied into the open casting tray. At the expiration of the preselected desolvation time (4.5 minutes) corresponding to the predetermined composition of the gas phase ambient to the newly cast film, the plate with its cast film was carefully submerged in the 3 percent acetone immersion bath. Care was taken to be certain that the film was completely immersed. The membrane was then left undisturbed in the room temperature immersion bath for several hours.

Thereafter, the membrane was hydrolyzed in a caustic solution. By way of example, the membrane was immersed in a 10 weight percent potassium hydroxide solution for about 3-10 minutes, whereby substantially all the cellulose acetate was hydrolyzed to cellulose. If the period of hydrolysis is too short, incomplete conversion occurs and if the period of hydrolysis is too long, the integrity of the membrane is destroyed. The hydrolyzed film was then immersed in a pure water bath to leach out the remaining potassium hydroxide. The film was withdrawn from the water bath and immersed in TEG-DME, which is miscible with water until the film became impregnated with TEG-DME. Prior to the impregnation, the film was considerably weaker than before the hydrolyzing step, but became considerably tougher, yet no less porous, than the film had been prior to hydrolyzing.

Other strong caustic agents, as for example NaOH, could be used as hydrolyzing materials and the concentration of the hydrolyzing solution may vary from about 1 percent to about 20 percent. The weaker solution would require a hydrolyzing period of greater than 10 minutes and the stronger solution would require a hydrolyzing period of less than 3 minutes.

Hydrolysis in the manner described, is required regardless of the cellulosic derivative employed as the matrix material to overcome solubility thereof in the polyethylene glycol.

In practicing the method described in the Loeb et al. patents and in the aforementioned application Ser. No. 672,025 the film produced is essentially a 2-layer structure in which a very thin compact upper layer rests on a porous matrix. The product produced by the method of the instant invention does not have the aforementioned thin compact layer as this portion of the structure is removed during the hydrolyzing step. After remaining in the 10 percent KOH hydrolyzing solution for approximately 1 minute, jagged lines appear on the surface of the compact layer and in about another minute extremely thin flakes float away from the porous matrix, these flakes having been the dense layer of the film. Removal of this dense layer in films to be used for gas separation can, in some instances, be particularly advantageous. That is, although at room temperature the dense layer is so thin that it offers essentially no resistance to gas permeation, when gas separation is conducted at temperatures in the range of from about 70 to about 80° C. the thickness of this dense layer is increased manyfold, thereby significantly affecting the gas permeation rates.

Preliminary permeability measurements of the immobilized film of TEG-DME have indicated that the $SO_2$ permeability thereof is approximately $$10,000 \times 10^{-9} \frac{\text{cc. gas (NTP), cm. thick}}{\text{sq. cm., sec., cm. Hg}\Delta P}$$

at about 25° C.

In spite of the exceptionally high permeability of the TEG-DME film to $SO_2$, the elimination of $SO_2$ from stack gas with such a film could not be a useful application, if it were not for the fact that this film is highly selective for $SO_2$ relative to the major constituents of stack gas, which are oxygen, nitrogen and carbon dioxide. As expected, the permeabilities of nitrogen and oxygen at about 25° C. in TEG-DME are low $$\left(3.2 \times 10^{-9} \frac{\text{cc. gas (NTP), cm. thick}}{\text{sq. cm., sec., cm. Hg}\Delta P} \text{ for nitrogen}\right)$$

However, carbon dioxide was expected to have a relatively high solubility in TEG-DME and it would be expected that carbon dioxide would have an excessively high permeability through a TEG-DME immobilized film. However, tests have shown that the solubility of $CO_2$ in TEG-DME is not excessively high and the permeability of $CO_2$ in TEG-DME is only $$105 \times 10^{-9} \frac{\text{cc. gas (NTP), cm. thick}}{\text{sq. cm., sec., cm. Hg}\Delta P}$$

at about 25° C. Thus, it appears that TEG-DME is highly selective for $SO_2$ and has the additional advantage of being essentially non-volatile at room temperature. For higher temperature applications higher molecular weight polyethylene glycols would be used, for example, hexethylene glycol dimethyl ether or a polyethylene glycol having a molecular weight of at least 450, either of which would be suitable for operation at about 100° C. Selection of the proper polyethylene glycol to use under a given set of conditions is primarily determined on the basis of vapor pressure. Thus, the vapor pressure of the liquid component of the film should be less than about 0.1 micron of mercury at the operating temperatures contemplated.

As an illustration of the performance that could be expected from a membrane system using an immobilized film of TEG-DME for $SO_2$ elimination from the stack gas emanating from a typical smelter, the stack gas from a smelter handling sulfide ores could contain 10 percent $SO_2$. By bringing this stack gas into contact with one side of the membrane of this invention and applying a sweep gas to the opposite side of the membrane, the gas transport through the membrane will be more than 95 percent $SO_2$. In place of using a sweep gas, the downstream of the liquid membrane may be subjected to a vacuum.

Therefore, a newly immobilized liquid film highly selective for sulphur dioxide separation has been disclosed and, as well, a method for its preparation.

What I claim as new and desire to secure by Letters Patent of the United States is:

1. A permeable membrane construction for use in the separation of sulphur dioxide gas from gas mixtures containing sulphur dioxide gas, said membrane comprising in combination a thin porous cellulose layer impregnated with a liquid polyethylene glycol.

2. The permeable membrane substantially as recited in claim 1 wherein the polyethylene glycol is tetraethylene glycol dimethyl ether.

3. In a process for the alteration of the composition of a mixture of gases wherein the initial mixture of gases is brought into contact with one side of a permeable membrane and a difference in partial pressure for specific gaseous components is maintained between said one side and the opposite side of said membrane whereby said specific gaseous components permeate through said film to produce a gas mixture on said opposite side altered from the composition of the initial mixture, the improvement comprising the step of:

(a) conducting the permeation of sulphur dioxide gas through a thin stationary porous cellulose layer impregnated with a liquid film of polyethylene glycol.

4. The improved method substantially as recited in claim 3 wherein the polyethylene glycol is tetraethylene glycol dimethyl ether.

References Cited

UNITED STATES PATENTS

| 3,335,545 | 8/1967 | Robb et al. | 55—16 |
| 3,396,510 | 8/1968 | Ward et al. | 55—16 |

OTHER REFERENCES

Albright et al.: Chemical Engineering Progress Symposium Series 44, vol. 59, 1963, "Solubility of Sulfur Dioxide in Polar Organic Solvents," pp. 66–74.

REUBEN FRIEDMAN, Primary Examiner

C. N. HART, Assistant Examiner

U.S. Cl. X.R

55—158, 73